United States Patent [19]

Saunders

[11] 3,822,049

[45] July 2, 1974

[54] ANTI-THEFT BRACKET DEVICE
[75] Inventor: Allan L. Saunders, Melrose, Mass.
[73] Assignee: Automatic Radio Mfg. Co. Inc., Melrose, Mass.
[22] Filed: Sept. 5, 1972
[21] Appl. No.: 286,274

[52] U.S. Cl. ................................. 248/203, 70/258
[51] Int. Cl. ...................... E05b 73/00, F16b 41/00
[58] Field of Search ........ 248/225, 203; 70/58, 258; 339/65, 66, 82; 224/42.45 R; 312/246

[56] References Cited
UNITED STATES PATENTS

| 2,548,533 | 4/1951 | Hendricks | 312/246 |
| 2,648,761 | 8/1953 | Shamel | 248/203 X |
| 2,793,092 | 5/1957 | Peterson | 312/246 |
| 2,897,928 | 8/1959 | Selig | 248/224 X |
| 2,965,344 | 12/1960 | Baker | 224/42.45 R X |
| 3,264,601 | 8/1966 | Hartholz | 339/65 X |
| 3,563,070 | 2/1971 | Earl | 70/58 X |

Primary Examiner—J. Franklin Foss
Attorney, Agent, or Firm—Chittick, Thompson & Pfund

[57] ABSTRACT

A bracket assembly for removably mounting an accessory, for example a tape player, radio, speaker or the like, to a support member, for example a vehicle dashboard, transmission hump or fire wall. The assembly includes a first bracket member adapted to be fixed relative to the support member and a second bracket member adapted to be fixed relative to the accessory. The accessory is removably mounted on the support member by slidably assembling the two bracket members in interlocked engagement. When thus assembled, the two bracket members are adapted to receive a separate lock, for example a conventional padlock, which prevents separation of the bracket members, thereby also preventing unauthorized removal of the accessory from the support member.

10 Claims, 7 Drawing Figures

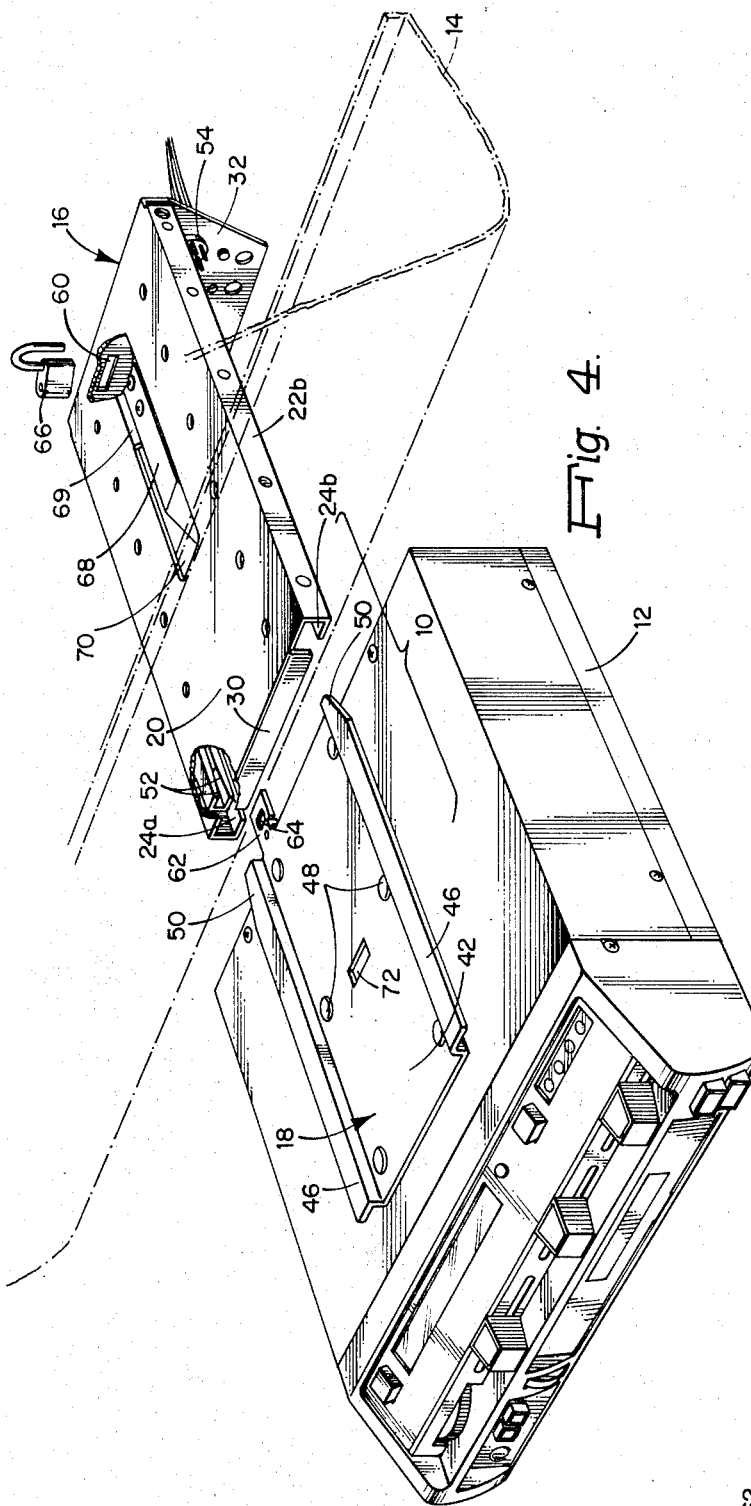
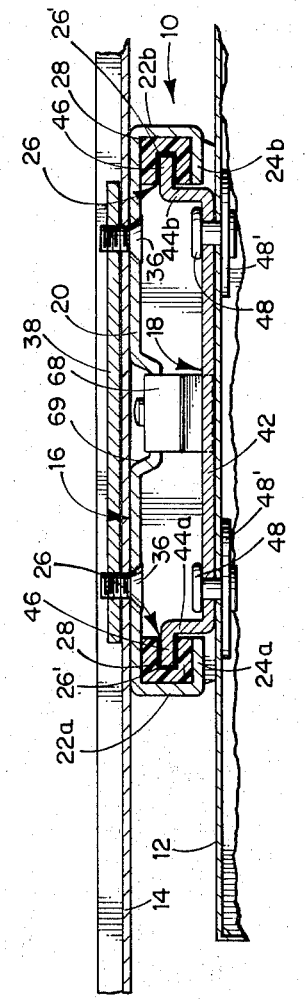
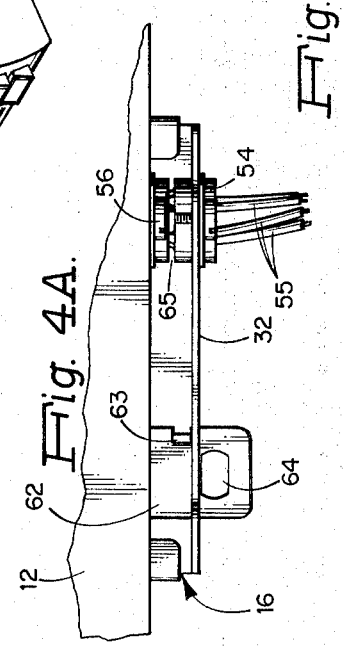

ANTI-THEFT BRACKET DEVICE

DESCRIPTION OF THE INVENTION

This invention relates generally to mounting means, and is particularly concerned with a novel and improved bracket assembly for removably mounting an accessory, for example a tape player, radio, speaker or the like to a support member, for example a vehicle dashboard, transmission hump or fire wall.

In the past, accessories of the above-mentioned type have been attached directly to an interior support surface of the vehicle, usually the underside of the dashboard, by mounting means which include conventional brackets, screws, etc. Such conventional mounting means require the use of tools such as screw drivers, pliers, etc. and thus do not permit the accessories to be conveniently removed and/or installed by the owner. Hence, once installed, the accessories are normally left in place.

This practice has given rise to problems, particularly when vehicles containing such accessories are left unattended for even a relatively short period of time. Experience has shown that a trained thief needs only a few minutes to remove a conventionally mounted accessory. Once removed, such accessories are entirely portable and easily salable through illegal channels. Hence, the incident rate of such thefts is extremely high, particularly in metropolitan areas.

It is, accordingly, an object of the present invention to avoid the above-mentioned problems by providing a novel and improved bracket assembly which will permit the owner to rapidly and conveniently remove and/or install an accessory whenever the need arises. To this end, the bracket assembly of the present invention includes a first bracket member adapted to be fixed relative to a vehicle support member and a second bracket member adapted to be fixed relative to the accessory. The bracket members are designed for rapid convenient slidable assembly and disassembly. When assembled, the bracket members are in firm interlocked engagement. The first bracket member preferably includes half of a male-female electrical connection, the other half being appropriately located on the accessory to thus provide an instantaneous electrical coupling as soon as the accessory is slidably mounted in place. These features permit the owner to remove the accessory from the interior of the vehicle whenever the vehicle is to be left unattended in a high-risk location, for example, when the vehicle is to be parked overnight on a city street or in a poorly lighted or unattended commercial parking facility. At such times, the accessory can be removed and locked out of sight in the trunk of the vehicle.

Another object of the present invention is to provide means for locking the two bracket members together to thus prevent unauthorized removal of the accessory while the latter remains mounted in the vehicle. To this end, the second bracket member is preferably provided with a tab which extends through an opening in the back wall of the first bracket member when the two bracket members are slidably assembled in interlocked engagement. The tab is suitably apertured to receive a separate locking device, for example a commercial padlock, which when in place prevents slidable separation of the bracket members and unauthorized removal of the instrument.

An optional mounting is provided for a padlock at a front location which is visible through the vehicle windows from the exterior of the vehicle. This optional mounting is intended to deter a would-be thief from breaking the window of a locked vehicle to gain access to the accessory, before discovering that the accessory is securely locked in place by means of the combination bracket assembly and padlock of the present invention.

The bracket members are each adapted to be secured to the vehicle support member and the accessory by fastening means specially located and adapted to prevent unauthorized removal of the accessory once the bracket members are assembled in interlocked engagement.

A further object of the present invention is to provide means cooperating with the first bracket member for adapting the bracket assembly for mounting on all types of vehicle support surfaces, including but not limited to inclined transmission humps and vertically extending fire walls.

These and other objects and advantages of the present invention will become more apparent as the description proceeds with the aid of the accompanying drawings wherein:

FIG. 3 is a sectional view taken along lines 3—3 of FIG. 2;

FIG. 4 is another perspective view showing the bracket assembly of FIGS. 1—3 in a disassembled exploded condition;

FIG. 4A is a partial bottom view on an enlarged scale showing the stop on the tab member of the second bracket member, and its relationship to the male-female electrical connection;

Figure 1:
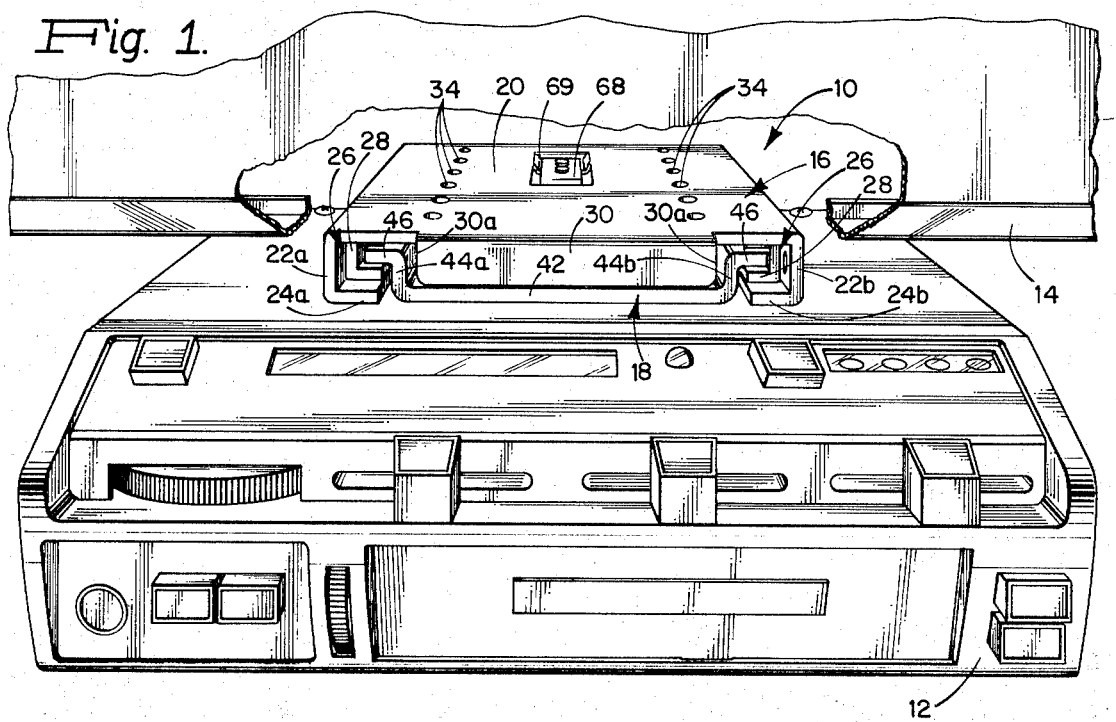
FIG. 1 is a front perspective view of an accessory mounted on the underside of a vehicle dashboard by means of a bracket assembly embodying the concepts of the present invention. Portions of the dashboard have been broken away to better illustrate the bracket assembly.
Figure 2:
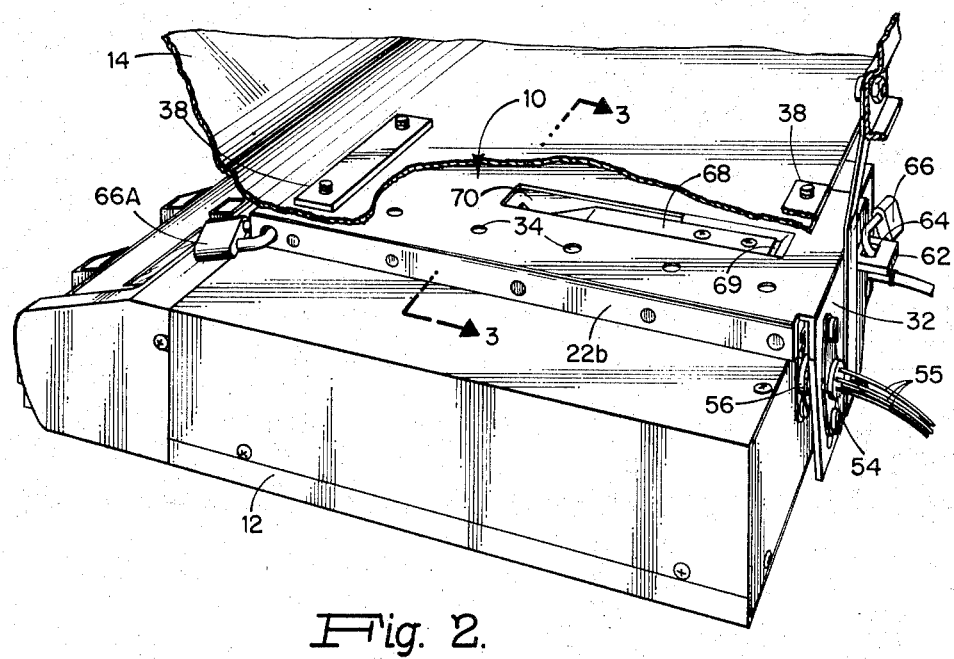
FIG. 2 is another perspective view from a different angle showing the accessory and bracket assembly illustrated in FIG. 1.

Referring now to the drawings, there is shown at 10 one embodiment of a bracket assembly embodying the concepts of the present invention. In FIGS. 1-3, the bracket assembly is shown in its assembled interlocked condition providing an anti-theft mounting for an accessory 12 on the underside of a vehicle dashboard 14. In the drawings the accessory 12 comprises an 8-track stereo tape player, but it will be understood that other types of accessories such as, for example, radios, speakers, etc., may also be mounted by means of the bracket assembly of the present invention.

The bracket assembly 10 is comprised basically of first and second bracket members 16 and 18. The first bracket member 16 includes a top plate 20 having laterally spaced oppositely disposed parallel side walls 22a and 22b depending downwardly from the side edges thereof. The side walls are in turn provided along their lower edges with inturned flanges 24a and 24b. The top plate 20, side walls 22a and 22b, and the inturned flanges 24a and 24b cooperate to define a pair of oppositely disposed guide grooves indicated generally by the reference numerals 26. Each of the guide grooves 26 is preferably lined with a channel-shaped piece 28, which is fabricated from a suitable non-metallic resilient material such as for example plastic, hard rubber or nylon. The channel-shaped liners each define smaller dimensioned guide groove 26'.

The first bracket member 16 further includes vertically depending front and rear wall members 30 and 32. The rear wall 32 extends across substantially the entire width of the top plate 20 and thus closes the rear ends of the guide grooves 26 and 26'. The front wall 30 has its ends 30a spaced from the side walls 22a and 22b to thus expose the front ends of the guide grooves 26 and 26'. The top plate 20 is suitably apertured as at 34 to accommodate machine screws 36, which cooperate with nut plates 38 to secure the first bracket member 16 directly to the underside of the dashboard 14, the latter having been previously drilled to accept the screws 36. Once attached, the first bracket member 16 remains in place for as long as the accessory 12 is to be used in the vehicle.

The second bracket member 18 includes a bottom plate 42 which is provided with upwardly extending oppositely disposed parallel side walls 44a and 44b, the latter terminating in laterally extending flanges 46. The bottom plate 42 of the second bracket member 18 is also suitably apertured to accommodate fastening devices, for example the rivets 48 and enlarged washers 48' which serve to attach the second bracket member directly to the upper surface of the accessory 12.

As is best shown in FIG. 4, the rear ends of the flanges 46 are preferably tapered inwardly as at 50 to facilitate insertion of the flanges into the guide grooves 26' formed by the channel-shaped liners 28. Preferably, the forward ends of the liners 28 are recessed inwardly from the front ends of the guide grooves 26 to expose mounting holes 29 in the side walls 22a and 22b. The purpose of the mounting holes will hereinafter be discussed in greater detail. The forward ends of the liners 28 are also preferably tapered as at 52. This arrangement facilitates slidable insertion of the flanges 46 into the guide grooves 26', there being a somewhat snug fit between each liner 28 and the flange received therein which in turn avoids subsequent rattling.

It will be appreciated from viewing FIGS. 1 and 3 that when the bracket members 16 and 18 are operatively assembled, the flanges 46 cooperate with the channel-shaped liners 28 which are in turn contained within the guide grooves 26 to establish an interlocked relationship which firmly holds the accessory 12 in place beneath the vehicle dashboard 14.

The rear wall 32 of the first bracket member 16 supports the male portion 54 of a male-female electrical connector, the female portion 56 being located on the rear side of the accessory 12. This arrangement provides for an automatic coupling of the accessory to the various electrical leads 55 required for operation when the accessory is mounted in place by sliding the second bracket member 18 into the first bracket member 16.

By the same token, this arrangement permits the accessory to be removed without the necessity of having to first disconnect various wire leads because disconnection is automatically effected as the bracket members 16 and 18 are slidably separated.

The rear wall 32 of the first bracket member 16 is additionally provided with a "first aperture" 60 through which protrudes a rearwardly extending tab 62 on the second bracket member 18 when the two bracket members are operatively assembled in interlocked engagement. The tab 62 is in turn provided with a "second aperture" 64 which is adapted to receive a separate locking device for example a conventional padlock as shown at 66 in FIGS. 2 and 4. When the padlock is operatively positioned and closed as shown in FIG. 2, the tab 62 cannot be withdrawn through aperture 60, and hence the accessory 12 cannot be removed.

The mounting holes 29 in the side walls 22a and 22b of the first bracket member 16 serve as "third apertures" which, as shown in FIG. 2, can accommodate an additional or alternate padlock 66A. The padlock 66A will be located near the front of the bracket assembly and the accessory 12, and will thus be visible through the vehicle windows, thereby deterring a would-be thief from breaking into a locked vehicle in order to gain access to the accessory.

As is best shown in FIG. 4A, the tab 62 is preferably additionally provided with stop means which can conveniently take the form of a down turned flange 63. The flange 63 will abut the back wall 32 of the first bracket member 16 when the bracket members are assembled in interlocked engagement, and will thus insure that a slight spacing as at 65 is provided between the male and female elements 54 and 56 of the electrical connector. This arrangement will prevent the elements of the electrical connector from being jammed together and damaged when the accessory is slidably mounted in place.

As is best shown in FIG. 1, the front wall member 30 of the first bracket member 16 extends downwardly to provide a barrier which will prevent the insertion of a tool, such as for example a large screw driver or tire iron, between the bracket members 16 and 18 when the latter are in interlocked engagement. This serves as an added safeguard against the possibility of someone attempting to pry the bracket members apart.

Other features which resist unauthorized removal of the accessory 12 include the enlarged washers 48' (FIG. 3) which prevent the heads of the rivets 48 from being pulled through the relatively thin top plate of the accessory. In addition, it will be observed that when the bracket members 16 and 18 are assembled in interlocked engagement, the machine screws 36 are inaccessible for removal, and the nut plates 38 cannot be rotated by someone reaching underneath the dashboard 14. These features all contribute to the anti-theft advantages of the present invention.

Preferably, the first bracket member is further provided with a resilient spring member 68, one end of which is seated in a depression 69 in top plate 20, and the other end of which protrudes downwardly through an opening 70. The spring member 68 is arranged to be initially biased upwardly as the second bracket member 18 is slidably inserted into the first bracket member 16, and to eventually seat itself in an opening 72 in the bottom plate 42. This arrangement provides a yieldable holding means which further assists in retaining the two bracket members in operative interlocked engagement, particularly in situations where the separate padlock 66 is not being employed.

Figure 5:
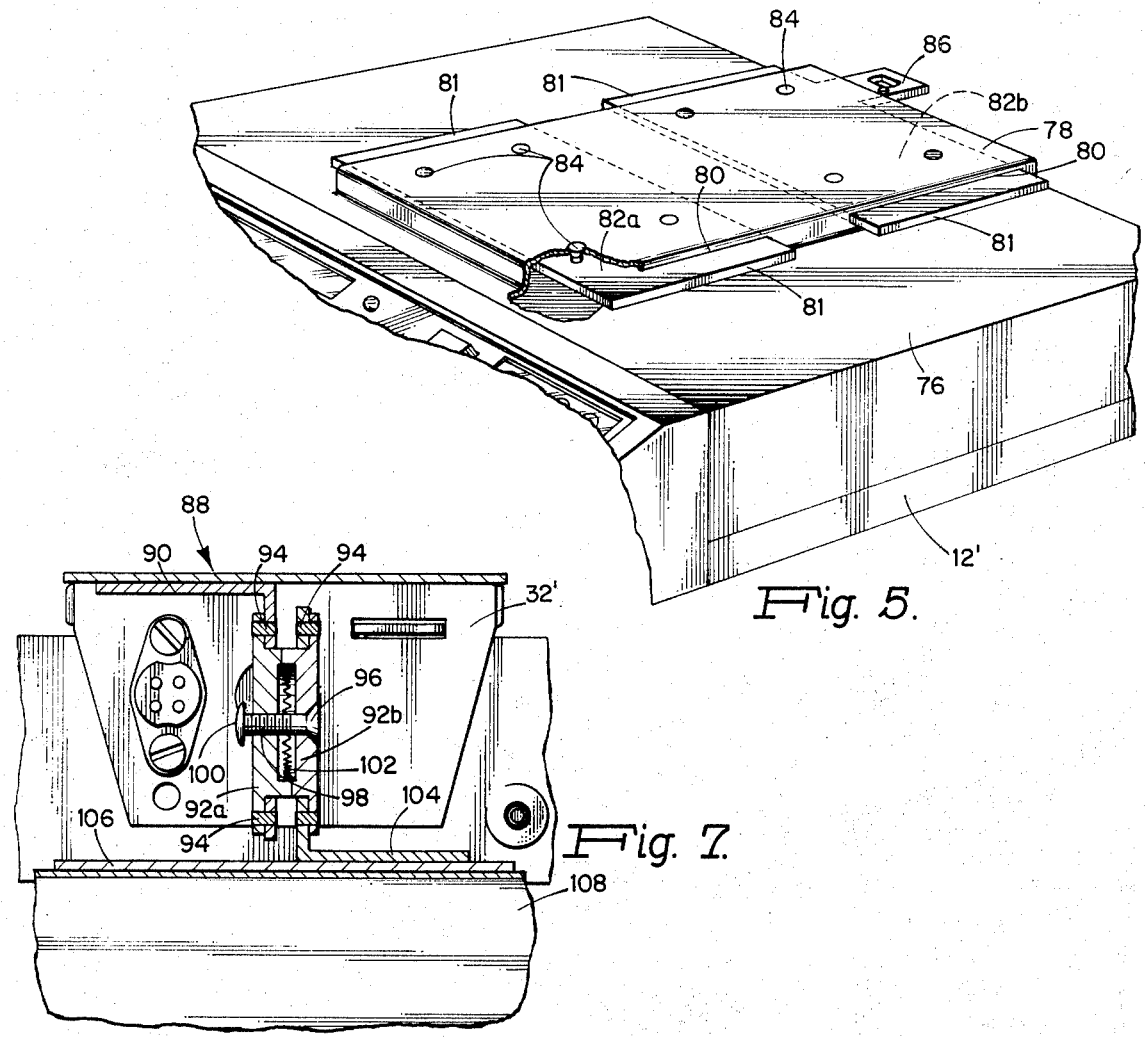
FIG. 5 is a perspective view, with portions broken away, of an alternate embodiment of the second bracket member.

A modified version of the second bracket member is shown in FIG. 5. Here it will be seen that the top surface 76 of the accessory 12' has been shaped by stamping to provide a raised generally rectangular hump 78. The hump 78 has side slots 80 through which protrude the ends 81 of flat second bracket members 82a and 82b. The second bracket members are held in place by conventional fastening devices, for example the rivets indicated typically at 84. The ends 81 serve as flanges which cooperate with the guide grooves 26' of the first bracket member 16, much in the same manner as the flanges 46 on the second bracket member 18 shown in FIGS. 1–3. The second bracket member 82b is also preferably provided with a tab 86 protruding rearwardly through a slot (not shown) in hump 78.

The arrangement shown in FIG. 5 provides even greater resistance to any attempt at prying the second bracket member away from the accessory 12, for to succeed in any such attempt would require complete destruction of the top surface of the accessory.

Figure 7:
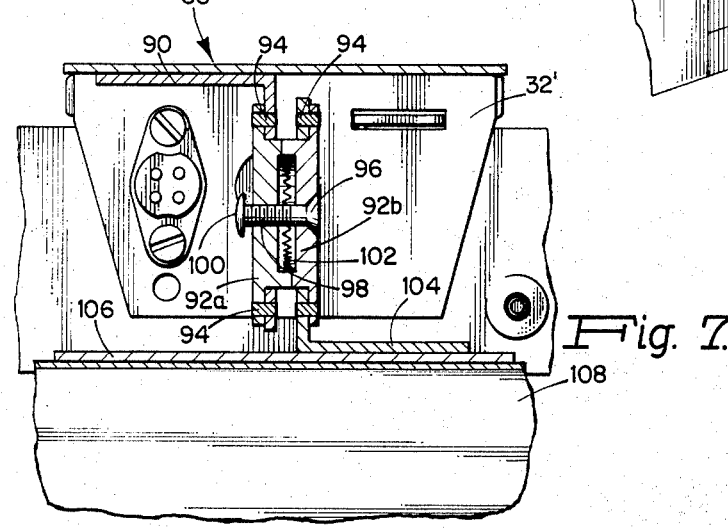
Figure 6:
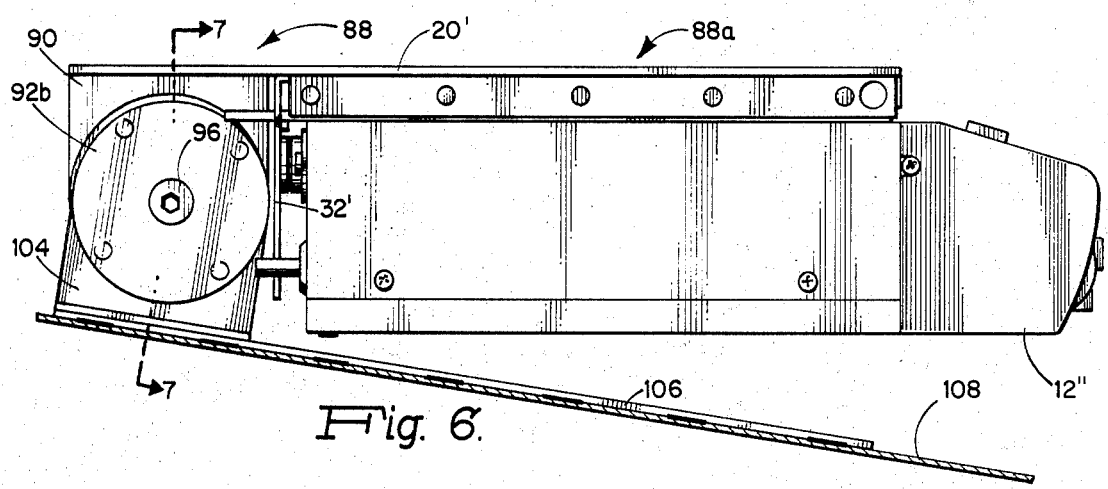
FIG. 6 is a view in side elevation of an alternate embodiment of the first bracket member which is particularly useful when mounting an accessory at a location other than the underside of a substantially horizontal support surface, for example on an inclined transmission hump or vertical fire wall; and, FIG. 7 is a sectional view taken along lines 7—7 of FIG. 6.

A modified version of the first bracket member is generally indicated at 88 in FIGS. 6 and 7. It will be understood that the first bracket member 88 is designed to receive a second bracket member of the type shown either in FIGS. 1–3 or FIG. 5, and hence a description of the second bracket member will not be repeated again here. The first bracket member 88 has a forward section 88a which is generally identical to that of the first bracket member 16 shown in FIGS. 1–3. However, the top plate 20' extends rearwardly beyond the rear wall 32' for attachment as by welding to a depending bracket 90. The bracket 90 in turn is suitably apertured to receive a collar 92a which is attached thereto by any suitable means, for example rivets indicated typically at 94. The collar 92a is held in mated cooperative relationship with another collar 92b by means of an Allenhead screw 96 which is threaded into the collar 92a as at 98. The end of the screw 96 is enlarged as by flattening at 100, and the collars 92a and 92b are provided with interengaging teeth indicated typically at 102. The collar 92b is attached, again conveniently by rivets 94, to another bracket 104 which is in turn attached as by welding to a base member 106. The base member is adapted to be secured, again as by welding, to a vehicle support surface such as for example an inclined transmission hump 108.

Once the base member 106 is attached to the vehicle support member, the screw 96 can be loosened and the mating collars 92a and 92b rotatably adjusted to place the top plate 20' of the first bracket member in a horizontal plane. The screw 96 is then tightened to thereafter maintain this adjustment. The flattened head 100 on the screw 96 prevents the latter from being completely unscrewed and thus prevents separation of the collars 92a and 92b and unauthorized removal of the accessory. The range of rotatable adjustments afforded by the first bracket member 88 is such that the base member 106 can be attached to a surface which is either horizontal, inclined, or vertical.

In light of the foregoing, it will now be appreciated by those skilled in the art that the bracket assembly of the present invention offers a number of significant advantages over those previously employed to mount accessories in vehicles. Examples of such advantages include providing an easy means for rapidly removing and mounting the accessory, as well as a convenient means for locking the accessory in place in its operative position, thereby markedly decreasing incidents of theft. Prior to leaving the vehicle unattended for any extended period of time, the owner can simply remove the accessory from the interior of the vehicle and store it in a safe place. Removal is effected by simply unlocking and disengaging the padlock 66 and/or 66A and thereafter pulling the accessory 12 and the second bracket member attached thereto out of the first bracket member which is firmly attached to a vehicle support surface. As the accessory is removed and the second bracket member is slidably withdrawn from the first bracket member, all electrical connections will be automatically uncoupled by separation of the male-female electrical connectors 54 and 56. The accessory may thereafter be rapidly and efficiently re-installed by reversing the above procedure.

When the first and second bracket members are operatively assembled in interlocked engagement, fastening elements such as for example the machine screws 36 are inaccessible, as are the rivets 48. Moreover, the depending front wall 30 on the first bracket member 16 further enhances the inherent security of the assembly by presenting a barrier against the insertion of a prying tool between the two bracket members.

The resilient channel-shaped liners 28 snugly surround the laterally extending flanges 46 of the second bracket member and thus avoid bothersome rattling which might otherwise develop. The cooperative engagement of the spring member 69 in the opening 72 of the second bracket member 18 further assists in maintaining the two bracket members in the desired interlocked relationship.

It is my intention to cover all changes and modifications of the embodiment herein chosen for purposes of disclosure which do not depart from the spirit and scope of the invention.

I claim:

1. A bracket assembly for removably attaching an electrically powered accessory to a support member, comprising: a first bracket member adapted to be fixed to the support member, said first bracket member having a first opening extending therethrough and being further provided with one half of a male-female electrical connector, the other half of the connector being included as an integral part of the accessory; a second bracket member adapted to be fixed to the accessory, said second bracket member being further adapted for slidable insertion into an operative position in interlocked engagement with said first bracket member, with the halves of said female connector operatively assembled; tab means on said second bracket member, said tab means being arranged to protrude through said first opening when said first and second bracket members are in interlocked engagement, said tab means having a second opening through which a separate locking means may be inserted to prevent withdrawal of said tab means from said first opening and separation of said second bracket member from said first bracket member.

2. The apparatus as claimed in claim 1 wherein said first bracket member is characterized by a top wall having means for accommodating the attachment thereof directly to the support member, a pair of oppositely disposed laterally spaced parallel side walls extending downwardly from the side edges of said top wall, flanges extending inwardly from the lower edges of said side walls, said flanges cooperating with said top wall and said side walls to define a pair of oppositely disposed guide grooves, and a rear wall depending from the rear edge of said top wall, the said first opening being located in said rear wall.

3. The apparatus as claimed in claim 2 wherein said second bracket member is comprised of a bottom wall having means for accommodating the attachment thereof directly to the accessory, a pair of oppositely disposed laterally spaced parallel side walls extending vertically from the side edges of said bottom wall, said side walls being further provided along the upper edges thereof with laterally extending flanges which are adapted to be slidably received in the guide grooves of said first bracket member when said first and second bracket members are assembled in interlocked engagement, said tab means extending rearwardly from said bottom wall.

4. The apparatus as claimed in claim 3 further characterized by channel-shaped resilient liner means in said guide grooves.

5. The apparatus as claimed in claim 2 further characterized by a front wall depending downwardly from the front edge of said top wall, there being a space between the side edges of said front wall and said side walls to permit slidable insertion of said second bracket member into interlocked engagement with said first bracket member.

6. The apparatus as claimed in claim 3 wherein the rear ends of said laterally extending flanges are tapered inwardly to facilitate slidable insertion thereof into the guide grooves of said first bracket member.

7. The apparatus as claimed in claim 1 further characterized by means on said first bracket member cooperating with spring means on said second bracket member to releasably and resiliently hold said first and second bracket members in interlocked engagement.

8. The apparatus as claimed in claim 7 wherein said spring means is comprised of a resilient leaf spring protruding downwardly through an opening in the top wall of said first bracket member.

9. A bracket device for removably attaching an accessory to a support member, for example the underside of a vehicle dashboard, said apparatus comprising: a first bracket member adapted to be fixed to the support member, said first bracket member including a top wall and pair of underlying oppositely disposed laterally spaced parallel guide grooves extending from the front edge of said top wall to the rear edge thereof, front and rear walls depending downwardly from the front and rear edges respectively of said top wall, said rear wall extending across substantially the full width of said top wall to close the rear ends of said guide grooves, the ends of said front wall being spaced from said side walls to expose the front ends of said guide grooves; a second bracket member adapted to be fixed to the accessory, said second bracket member having laterally extending flanges which are suitably shaped and dimensioned for slidable insertion into the guide grooves of said first bracket member when said first and second bracket members are operatively assembled in interlocked engagement; a first opening on the back member of said first bracket member; tab means on said second bracket members, said tab means being positioned to extend through said first opening when said first and second bracket members are operatively assembled in interlocked engagement; and, a second opening on said tab means, said second opening being located to the rear of said rear wall when said first and second bracket members are operatively assembled in interlocked engagement, said second opening being adapted to receive a separate locking means which will prevent withdrawal of said tab means from said first opening.

10. The apparatus as claimed in claim 9 further characterized by third opening means in said first bracket member adjacent to the entry ends of said guide grooves, said third opening means being adapted to receive a separate locking device which will prevent slidable withdrawal of said laterally extending flanges from said guide grooves.

* * * * *